H. SIEGELSTYL.
REFRIGERATOR.

No. 192,465.

Patented June 26, 1877.

Witnesses.
A. Rupkert,
Jno. F. Mason

H. Siegelstyl
Inventor.
D. P. Holloway & Co
Attys.

UNITED STATES PATENT OFFICE.

HENRY SIEGELSTYL, OF LOUISVILLE, KENTUCKY.

IMPROVEMENT IN REFRIGERATORS.

Specification forming part of Letters Patent No. 192,465, dated June 26, 1877; application filed March 13, 1877.

*To all whom it may concern:*

Be it known that I, HENRY SIEGELSTYL, of Louisville, in the county of Jefferson and State of Kentucky, have invented a new and useful Improvement in Refrigerators, of which the following is a specification:

This invention is especially designed for refrigerating upon a large scale, as for butchers and others using refrigerating-chambers, and for cooling beer and other liquids in the process of manufacture. My claim is herein not limited to any particular use or proportions.

Figure 1:
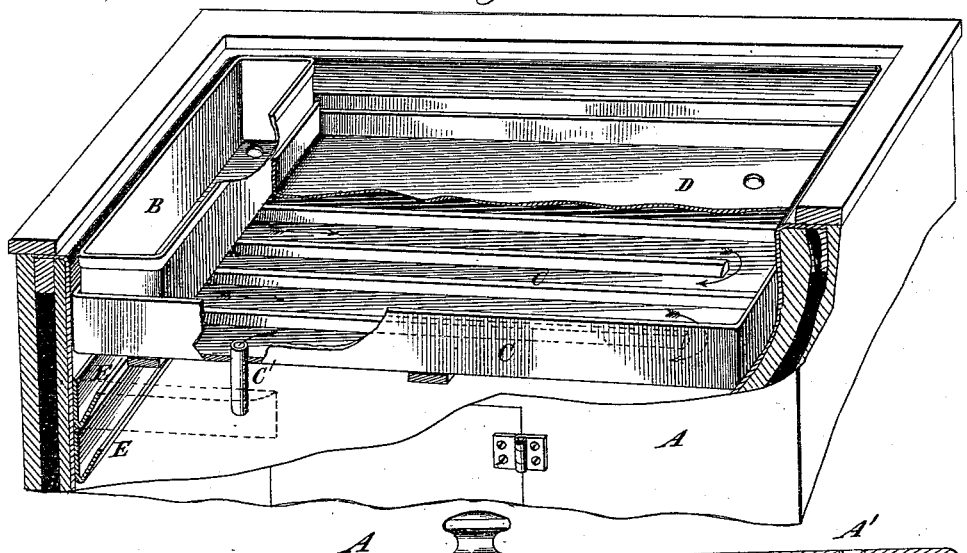
Figure 2:
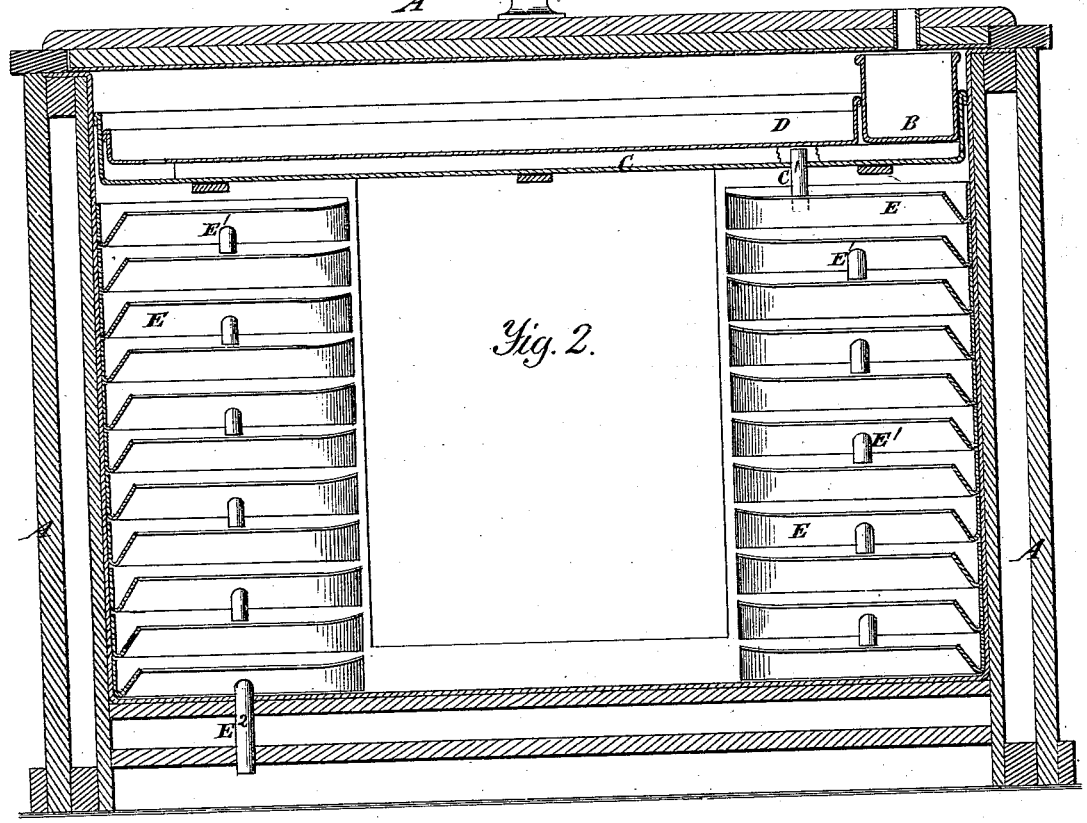

In the annexed drawings, making part of this specification, Figure 1 is a perspective view of the upper part of the refrigerator, the casing being broken away to show the interior. Fig. 2 is a vertical longitudinal section.

The same letters are employed in both figures in the indication of identical parts.

A is the case or wall of the refrigerating-chamber, constructed in any known manner most effectually to prevent radiation and loss by the passage of heat. A hole through the cover is intended to admit, at A′, a stream of water or other liquid to be refrigerated, which flows into the trough B placed in the end of the upper chamber. It has a pipe or hole through which the water or other liquid flows into the end of a tortuous channel formed by a series of cleats of less length than the box C, and alternately disposed, so as to require the liquid to flow repeatedly from end to end of the pan before escaping through the pipe C′. This pipe rises above the bottom of the pan and nearly to the top of the cleats, so that the passage of the liquid through the chamber shall leave it exposed to the refrigerating action of the ice in the pan D, which overlies the pan C, but is in near contiguity to the surface of water in the latter. When water is employed as the liquid to be refrigerated, the melted ice-water may flow directly into the pan C; but, if beer is to be cooled, the water from the melting ice must be led off through a pipe.

When the refrigerated liquid has traversed the channels in pan C it flows down into the trough E, placed around the walls of the lower chamber; then flowing around the chamber in the trough E, it flows down through the pipe $E^1$ into the next lower trough, and so alternately through the entire series, escaping finally through the discharge-pipe $E^2$. Should the refrigerator be used for cooling beer, ice may also be placed in the lower chamber, to bring down the temperature, or only a refrigerating pan, C, as shown in the upper chamber, may be employed, the pipe C′ in that case being extended to the vat or other receptacle for the beer.

What I claim as my invention, and desire to secure by Letters Patent, is—

The combination, with the ice-pan D, of the trough B, which receives the liquid to be cooled, and the pan C, having a tortuous channel formed on its bottom into which the liquid is delivered at one end and discharged at the other through the elevated discharge C′, substantially as set forth.

In testimony whereof I have signed my name to this specification in the presence of two subscribing witnesses.

HENRY SIEGELSTYL.

Witnesses:
  GREGORY B. KITELEY,
  HENRY KRAFT.